(12) United States Patent
Wong et al.

(10) Patent No.: US 8,705,898 B2
(45) Date of Patent: Apr. 22, 2014

(54) SYSTEMS, DEVICES AND METHODS FOR TUNING A RESONANT WAVELENGTH OF AN OPTICAL RESONATOR AND DISPERSION PROPERTIES OF A PHOTONIC CRYSTAL WAVEGUIDE

(75) Inventors: Chee Wei Wong, New York, NY (US); Xiaodong Yang, New York, NY (US); Charlton Chen, Gambrills, MD (US); Chad Husko, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 352 days.

(21) Appl. No.: 12/664,627

(22) PCT Filed: Jun. 16, 2008

(86) PCT No.: PCT/US2008/067106
§ 371 (c)(1),
(2), (4) Date: May 28, 2010

(87) PCT Pub. No.: WO2008/157484
PCT Pub. Date: Dec. 24, 2008

(65) Prior Publication Data
US 2010/0270481 A1 Oct. 28, 2010

Related U.S. Application Data

(60) Provisional application No. 60/934,660, filed on Jun. 15, 2007.

(51) Int. Cl.
*G02F 1/01* (2006.01)
*G02B 6/26* (2006.01)
*G02B 6/42* (2006.01)

(52) U.S. Cl.
USPC ............. 385/1; 385/5; 385/27; 385/39

(58) Field of Classification Search
USPC .................................. 385/1, 5, 27, 39
See application file for complete search history.

(56) References Cited

U.S. PATENT DOCUMENTS

| 5,023,944 A | 6/1991 | Bradley |
| 6,804,283 B2 | 10/2004 | Scherer |

(Continued)

OTHER PUBLICATIONS

Karle, T.J. et al. "Observation of Pulse Compression in Photonic Crystal Coupled Cavity Waveguides". Journal of Lightwave Technology, vol. 22, No. 2, Feb. 2004. pp. 514-519.

(Continued)

*Primary Examiner* — Ryan Lepisto
(74) *Attorney, Agent, or Firm* — Lisa A. Chianni; Walter M. Egbert, III; Hughes Hubbard & Reed LLP

(57) ABSTRACT

Some embodiments of the disclosed subject matter provide systems, devices, and methods for tuning resonant wavelengths of an optical resonator. Some embodiments of the disclosed subject matter provide systems, devices, and methods for tuning dispersion properties of photonic crystal waveguides. In some embodiments, methods for tuning a resonant wavelength of an optical resonator are provided, the methods including: providing an optical resonator having a surface; determining an initial resonant wavelength emitted by the optical resonator in response to an electromagnetic radiation input; determining a number of layers of dielectric material based on a difference between the initial resonant wavelength and a target resonant wavelength and a predetermined tuning characteristic; and applying the determined number of layers of dielectric material to the surface of the optical resonator to tune the initial resonant wavelength to a tuned resonant wavelength.

21 Claims, 12 Drawing Sheets

(56) References Cited

U.S. PATENT DOCUMENTS

| | | |
|---|---|---|
| 6,895,154 B2 | 5/2005 | Johnson et al. |
| 7,092,590 B2 * | 8/2006 | Lim et al. ............ 385/15 |
| 7,122,415 B2 * | 10/2006 | Jang et al. ............ 438/201 |
| 7,206,513 B2 | 4/2007 | Lee et al. |
| 2005/0040410 A1 * | 2/2005 | Ledentsov et al. ............ 257/79 |
| 2006/0115212 A1 * | 6/2006 | Yanik et al. ............ 385/27 |
| 2007/0036479 A1 * | 2/2007 | Beausoleil ............ 385/12 |

OTHER PUBLICATIONS

English language International Search Report for International Application No. PCT/US2008/067106 filed Jun. 16, 2008.

* cited by examiner

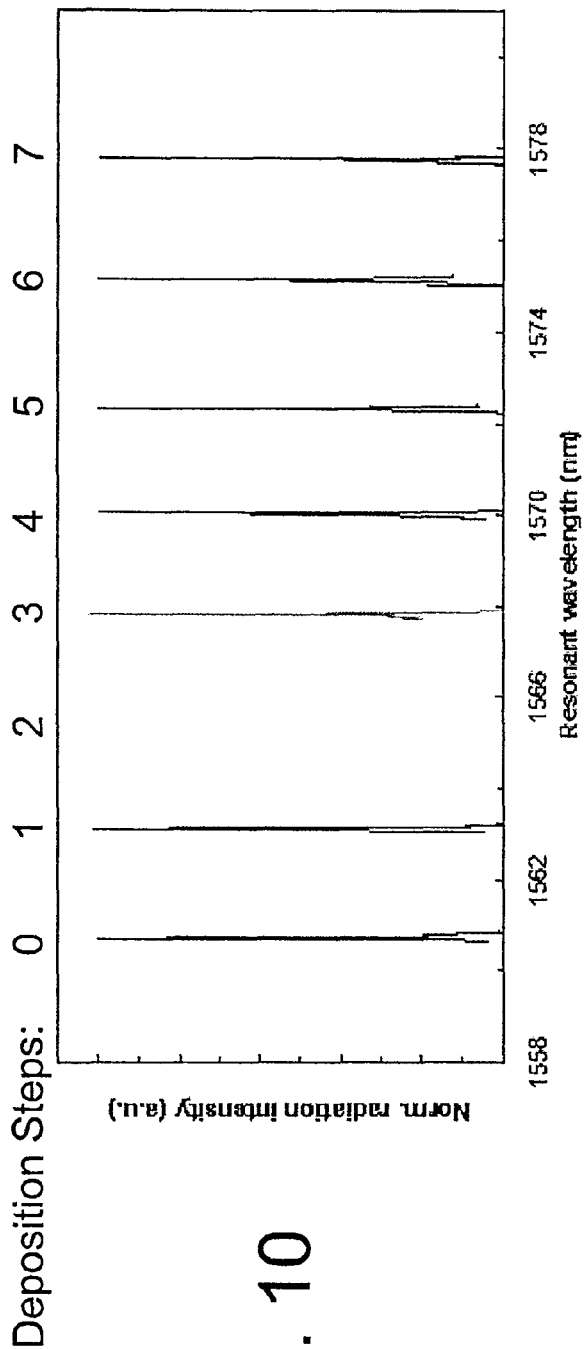
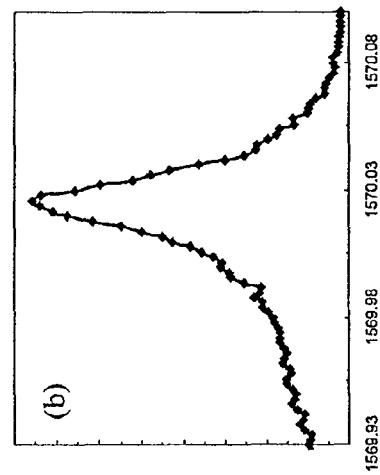
FIG. 10
FIG. 11

SYSTEMS, DEVICES AND METHODS FOR TUNING A RESONANT WAVELENGTH OF AN OPTICAL RESONATOR AND DISPERSION PROPERTIES OF A PHOTONIC CRYSTAL WAVEGUIDE

CROSS-REFERENCE TO RELATED APPLICATION

This application claims the benefit under of U.S. Provisional Patent Application No. 60/934,660, filed Jun. 15, 2007, which is hereby incorporated by reference herein in its entirety.

STATEMENT REGARDING FEDERALLY SPONSORED RESEARCH OR DEVELOPMENT

This invention was made with government support under Grant No. 06-22069 awarded by National Science Foundation, Electrical, Communications and Cyber Systems Division (NSF ECCS). The government has certain rights in this invention.

TECHNICAL FIELD

The disclosed subject matter relates to systems, devices, and methods for tuning a resonant wavelength of an optical resonator and for tuning a dispersion property of a photonic crystal waveguide.

BACKGROUND

Photonic crystals are periodic dielectric structures having band gaps that inhibit the propagation of a certain frequency range of electromagnetic radiation (e.g., visible light, infrared, microwave, etc.). Photonic crystals include regularly repeating internal regions of high and low dielectric constant. Whether electromagnetic radiation (i.e., streams of photons) propagates through a photonic crystal depends on the radiation's wavelength as well as various properties of the crystal.

Two-dimensional (2D) photonic crystal slabs confine light by Bragg reflection in-plane and total internal reflection in the third dimension. Introduction of point and line defects into 2D photonic crystal slabs create localized resonant cavities and PhC waveguides respectively. Such defect cavities in high-index contrast materials possess strong confinement with subwavelength modal volumes ($V_m$) at approximately $(\lambda/n)^3$, corresponding to high field intensities per photon for increased nonlinear interaction. Moreover, photonic crystal cavities with high quality factors (Q) have been achieved recently, now permitting nanosecond photon lifetimes for enhanced light-matter interactions. The strong localization and long photon lifetimes in these high-Q/Vm photonic crystal nanocavities point to enhanced nonlinear optical physics such as optical bistability, Raman lasing, and cavity quantum electrodynamics in silicon photonics. However, these applications can require precise control of resonant wavelength emissions to achieve desired device performance.

SUMMARY

Some embodiments of the disclosed subject matter provide systems, devices, and methods for tuning resonant wavelengths of an optical resonator. Some embodiments of the disclosed subject matter provide systems, devices, and methods for tuning dispersion properties of photonic crystal waveguides. In some embodiments, methods for tuning a resonant wavelength of an optical resonator are provided, the methods including: providing an optical resonator having a surface; determining an initial resonant wavelength emitted by the optical resonator in response to an electromagnetic radiation input; determining a number of layers of dielectric material based on a difference between the initial resonant wavelength and a target resonant wavelength and a predetermined tuning characteristic; and applying the determined number of layers of dielectric material to the surface of the optical resonator to tune the initial resonant wavelength to a tuned resonant wavelength.

In some embodiments, devices for emitting radiation of a tuned resonant wavelength from a tuned optical resonator are providing, including: an optical resonator having a surface; and a number of layers of dielectric material deposited on the surface of the optical resonator, wherein the number of layers is determined based on a difference between an initial resonant wavelength emitted by the resonator in response to an electromagnetic radiation input and a target resonant wavelength and a predetermined tuning characteristic.

In some embodiments, systems for emitting radiation of desired wavelengths are provided, including: an optical resonator having a surface; and a number of layers of dielectric material deposited on the surface of the optical resonator, wherein the number of layers is determined based on a difference between an initial resonant wavelength emitted by the resonator in response to an electromagnetic radiation input received at an input port and a target resonant wavelength and a predetermined tuning characteristic; a source of electromagnetic radiation directed at the input port; and an output port emitting radiation of the desired wavelength in response to the input port being exposed to electromagnetic radiation from the source.

In some embodiments, methods for tuning dispersion properties of a photonic crystal waveguide are provided, the methods including: providing a photonic crystal waveguide; determining an initial dispersion property of the crystal waveguide; determining a number of layers of dielectric material based on a difference between the initial dispersion property and a target dispersion property and a predetermined tuning characteristic; and applying the determined number of layers of dielectric material to the photonic crystal to tune the initial dispersion property to a tuned dispersion property.

BRIEF DESCRIPTION OF THE DRAWINGS

FIG. 10 is a graph illustrating measured resonant wavelength after various deposition steps in accordance with some embodiments of the disclosed subject matter.

FIG. 11 is a graph illustrating a magnified resonance peak after a fourth deposition step in accordance with some embodiments of the disclosed subject matter.

DETAILED DESCRIPTION

Some embodiments of the disclosed subject matter provide systems, devices, and methods for tuning resonant wavelengths of an optical resonator. Some embodiments of the disclosed subject matter provide systems, devices, and methods for tuning dispersion properties (e.g., group velocity, group index, etc.) of photonic crystal waveguides. Some embodiments of the disclosed subject matter provide systems, devices, and methods for emitting radiation of a tuned resonant wavelength. Some embodiments of the disclosed subject matter provide systems, devices, and methods for providing transmissions according to tuned dispersion properties. Optical resonators can include, for example, whispering gallery mode structures, micro-disks, micro-spheres, micro-rings, photonic crystal cavities, racetrack resonators, etc. Devices for providing transmissions according to tuned dispersion properties can include, for example, channel waveguides, periodic dielectric waveguides, slow light photonic crystal waveguides, etc. Some embodiments can provide resonant wavelength tuning and/or dispersion property tuning where the tuning is step-by-step in approximately uniformly sized steps.

Figure 1:
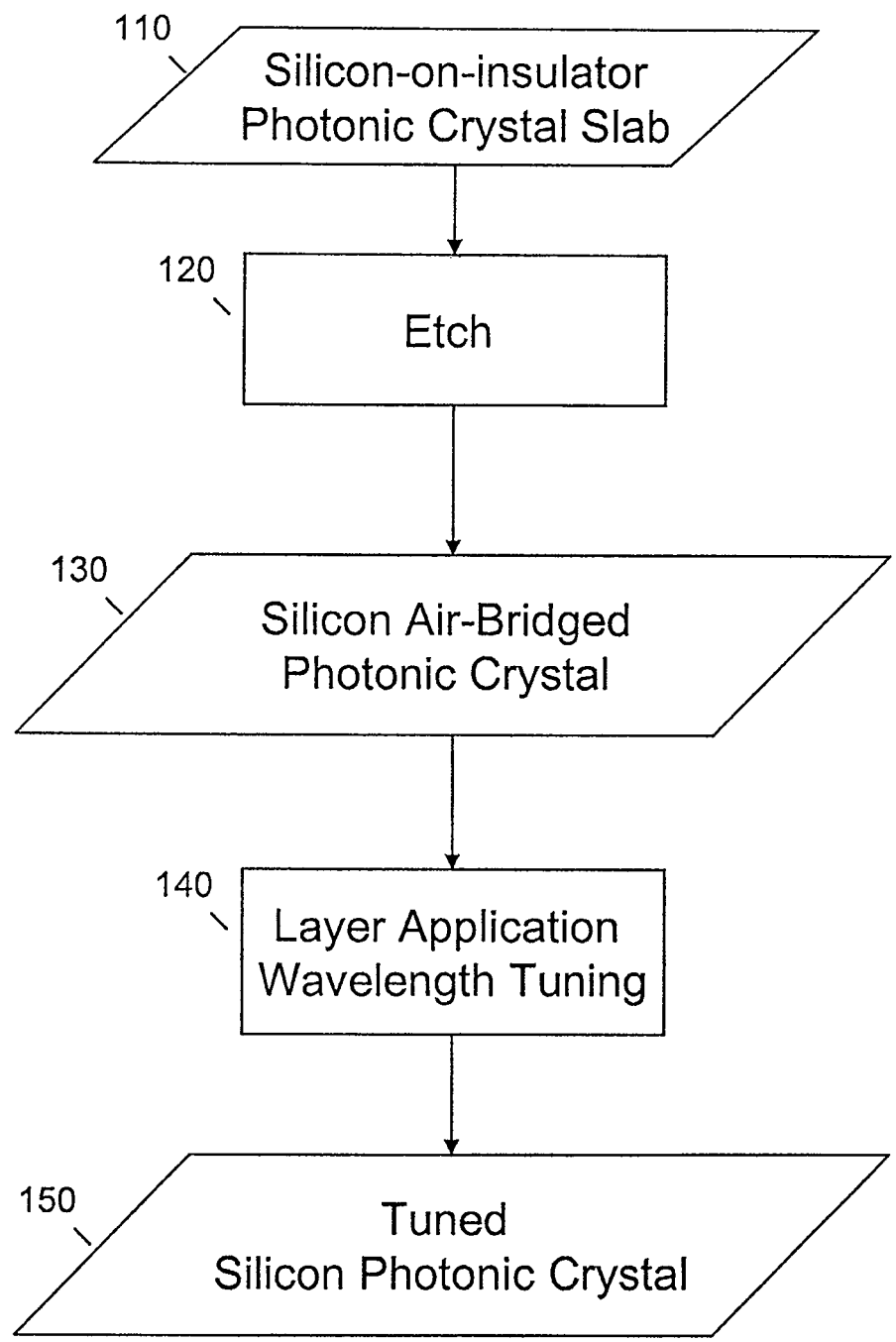
FIG. 1 is a simplified illustration of a method for providing tuning of a silicon air-bridged photonic crystal in accordance with some embodiments of the disclosed subject matter.

FIG. 1 illustrates a method of tuning a photonic crystal slab 110 in accordance with some embodiments. Slab 110, which can be, for example a silicon-on-insulator photonic crystal slab can be etched, at 120, to produce an air-bridged photonic crystal 130. Etching at 120 can be, for example, etching of a silicon substrate of silicon-on-insulator photonic crystal slab 110. Crystal 130 can be tuned, at 140, using layer application tuning, to produce a tuned photonic crystal 150. In some embodiments tuning, at 140, can be, for example, post-fabrication digital resonant wavelength tuning of high-Q/Vm silicon photonic crystal nanocavities using self-limiting atomic layer deposition of a dielectric material (e.g., hafnium oxide ($HfO_2$), aluminum oxide ($Al_2O_3$), titanium dioxide ($TiO_2$), silicon dioxide ($SiO_2$), gallium nitride (GaN), silicon nitride ($Si_3N_4$), etc. For example, crystal 130 can be a high-Q/Vm silicon photonic crystal with a nanocavity and layer application tuning 140 can apply $HfO_2$ using, for example, atomic layer deposition (ALD).

In some embodiments, specific resonant wavelengths are desired to be emitted from a resonator. In some embodiments, specific dispersion properties are desired in the transmissions in a photonic crystal waveguide. For example, specific resonant wavelengths can be desired to be emitted from a nanocavity of a photonic crystal and/or specific dispersion properties can be desired in a photonic crystal waveguide when the crystal is exposed to, for example, laser light. For example, etching, at 120, can produce crystal 130, which emits resonant wavelengths reasonably close to the desired wavelength and/or has dispersion properties reasonably close to the desired dispersion properties. However, the resonant wavelengths of optical resonators and/or dispersions properties of waveguides may not be close enough to the desired resonant wavelengths and/or desired dispersion properties for some applications. Layer deposition tuning 140 can be used to increase the resonant wavelength and/or alter the dispersion properties to a point where they are sufficiently close to that desired. Furthermore, the resonant wavelength and/or dispersion properties can be altered in predictable increments that are small enough not to, for example, jump far past the desired resonant wavelength. To determine whether the resonant wavelength and/or dispersion properties are sufficiently close to that desired, radiation from resonators and/or through waveguides can be analyzed to determine whether they are close enough to that desired after each conformal coating step of the layer deposition tuning, at 140.

Figure 2:
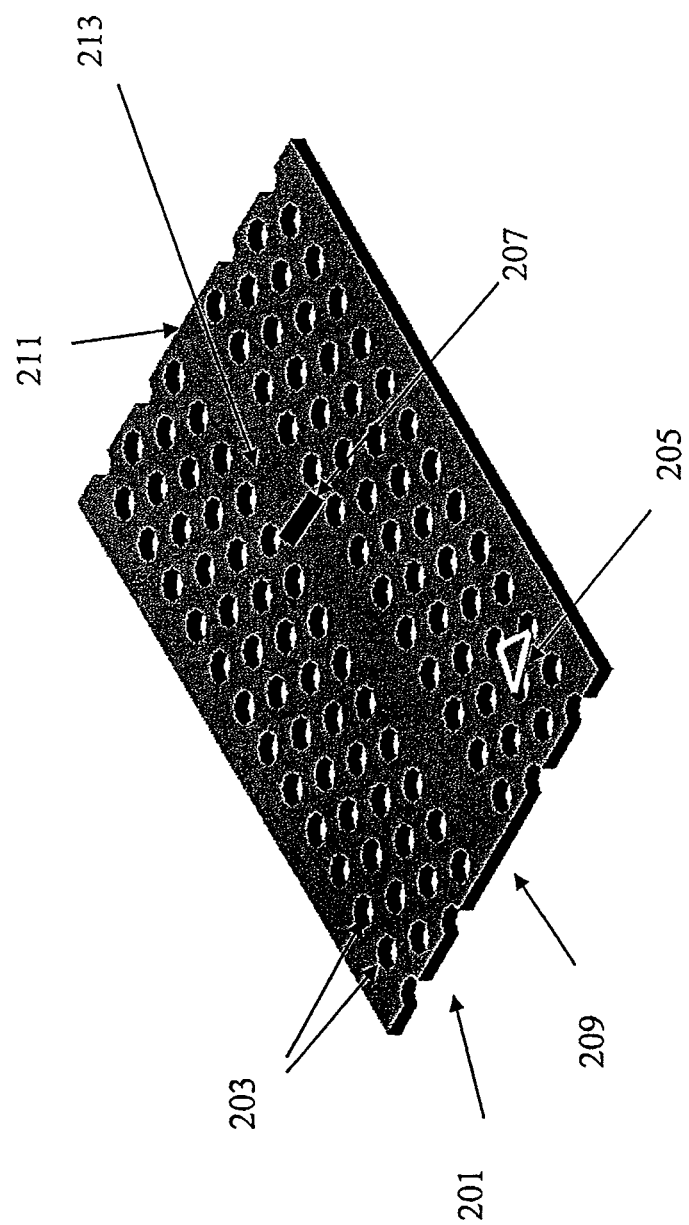
FIG. 2 is a simplified illustration of a magnified view of photonic crystal that can be tuned in accordance with some embodiments of the disclosed subject matter.

An example crystal 130 that be used in accordance with some embodiments is illustrated in FIG. 2 (which can be, for example crystal 130 of FIG. 1). Photonic crystal 201 can be formed from a layer of silicon on an insulator layer (e.g., a layer of oxide, $S_iO_2$) (not shown). The layer of silicon can be formed using various semiconductor fabrication methods. For example, the layer of silicon can be deposited or grown on the layer underneath it. In another example, a prefabricated wafer that has a silicon layer already formed on an oxide layer can be used. A lattice of air-holes 203 can be formed by etching the silicon layer (e.g., at 130 of FIG. 1). Etching of the silicon layer can be achieved by various methods (e.g., plasma etching, wet etching, etc.). Although FIG. 2 illustrates the air-holes having a cylindrical shape, the air-holes can be in various other shapes (e.g., rectangular, ellipsoidal, etc.). In some embodiments, the air-holes can have rough edges introduced during fabrication processes. Air-holes can be of various depths. For example, the depths can be substantially equal to the thickness of the silicon layer (i.e., go all the way through the crystal).

The lattice of air-holes 203 also forms basic patterns 205. The example in FIG. 2 illustrates a lattice as having a triangular shape 2305. However, the lattice can be formed using other patterns (e.g., squares, rectangles, pentagons, etc.). The distance between each hole (i.e., the length of each side of triangle 205) is referred to as the lattice constant. The etching step can also create defects (e.g., areas with no air-holes) in the lattice. In FIG. 2, the defects form a line of air-hole free region that is a pathway, which is an optical waveguide 207. A waveguide can be, for example, an optically transparent or low attenuation material that is used for the transmission of signals with light waves.

Defects can also form air-hole free regions referred to as localized resonant cavities. For example, FIG. 3A illustrates localized resonant cavity 350 formed by linearly aligned missing air-holes. Localized resonant cavity 350 can be designed using, for example, software for computing band structures, (e.g., the MIT Photonic-Bands (MPB) package, currently available at http://ab-initio.mit.edu/wiki/index.php/MIT_Photonic_Bands) and the 3D Finite-difference time-domain (FDTD) method. The resonances of cavity 350 can be tuned, for example, by adjusting the lattice constant and hole radii of the air holes of crystal 201 (as well as by tuning at 140). In some embodiments, radiation can be inputted into crystal 201 at input 209, the resonant wavelength can be measured as emanating from a nanocavity (not shown) (e.g., 350 of FIG. 3A), and transmissions through waveguide 207 can be measured from output 211 to determine the dispersion properties of the waveguide.

In some embodiments, photonic crystal 300 can be an air-bridged triangular lattice photonic crystal slab with silicon membrane thickness of 190 nm (t/a=0.4524) and air hole radii of 90 nm (r/a=0.2143), where the lattice period a=420 nm. FIG. 3A illustrates high-Q/Vm nanocavities with, for example, five linearly aligned ("L5") missing air holes can be side coupled with photonic crystal waveguide. A shift S1 of two air-holes at cavity edge can be various sizes, for example, 0.02a, 0.06a or 0.10a. Various shift sizes can be tested to, for example, tune the radiation mode pattern for increasing a Q factor. In the example of FIG. 3A, the waveguide-to-cavity separation 310 is five layers of holes.

Photonic crystal 300 can be produced using various systems and methods. These methods can take place, for example, at various times before tuning at 140 of FIG. 1. For example, photonic crystal 300 can be initially patterned with deep UV lithography. Subsequently, crystal 300 can be etched, for example, with a $SF_6/C_4F_8$-based inductively coupled plasma (ICP) into a silicon-on-insulator substrate. Optical lithography with, for example, AZ4620 photoresist can be used to open a window in photonic crystal region. Air-bridged structures can be released, using, for example, a bath in hydrogen fluoride (HF) buffered oxide etch (BOE) (6:1) for ten minutes. Samples can be cleaned using, for example, Piranha ($H_2SO_4:H_2O_2$ 3:1) solution for 5 minutes followed by HF BOE (6:1) solution dip for 30 seconds and deionized water rinse. Hot methanol can be used as a final rinsing liquid to prevent stiction with the lower surface tension of methanol compared to water. In some embodiments, this procedure can results in approximately 6 Å of (O—H)-terminated silicon oxide on the surface of silicon air-bridged photonic crystal slabs. Samples can be exposed to UV generated ozone for 10 minutes to restore the hydrophilic character of surface immediately prior to $HfO_2$ deposition.

Figures 5, 6:
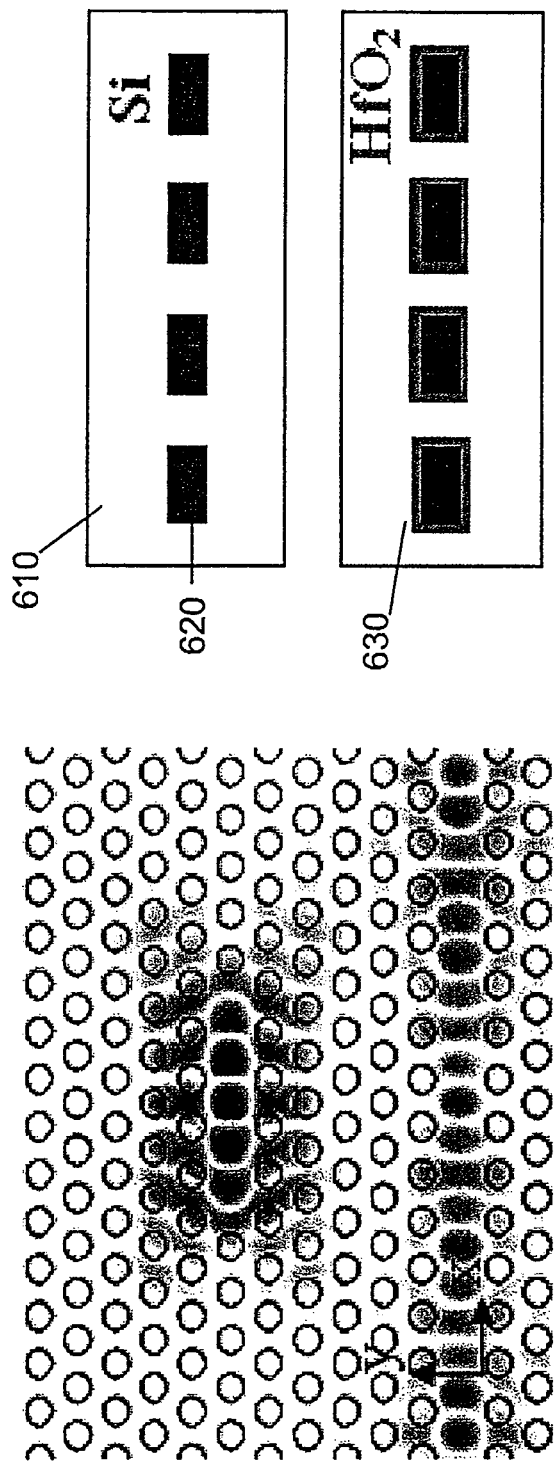
FIG. 5 is an illustration of a 3D FDTD calculated filed profile of a high-Q mode supported in L5 nanocavities tuned in accordance with some embodiments of the disclosed subject matter.
FIG. 6 is an illustration of a deposition schematic cross section of a tuned silicon photonic crystal in accordance with some embodiments of the disclosed subject matter.

FIG. 3A illustrates a top-view scanning electron microscopy (SEM) image including an air-bridged L5 cavity with S1=0.02a before layer deposition tuning. The crystal pictured in FIG. 3A can be, for example, silicon air-bridged photonic crystal 130 of FIG. 1. FIG. 5 illustrates the electric field $E_y$ of the resonance mode mid slab from 3D finite-difference time-domain simulations, calculated using a software package with subpixel smoothing for increased accuracy. This resonance can be measured as emanating from cavity 350.

Crystal 130 can be provided for tuning, at 140, by, for example, placing crystal 130 in a tuning system. Layer deposition tuning, at 140, can be accomplished using various systems and methods, for example, atomic layer deposition (ALD), e-beam deposition, plasma enhanced chemical vapor deposition thermal evaporation (PECB), thermal oxidation, etc. For example, at tuning 140, thin films of amorphous $HfO_2$ can be deposited conformally on a silicon air-bridged photonic crystal slab (e.g., crystal 300) by means of ALD at, for example, 150° C. Films can be deposited using, for example, tetrakis(diethylamido)hafnium (IV) [Hf(DEA)$_4$] and water ($H_2O$) vapor in alternating pulses with $N_2$ purge of the reaction chamber between pulses. Each deposition step can include 20 layer deposition cycles, where each cycle includes a Hf(DEA)$_4$ injection for 0.25 s, $N_2$ purge for 150 s, $H_2O$ injection for 0.02 s, and $N_2$ purge for 200 s. In some embodiments, the observed linear deposition rate is around 0.93 Å per cycle, which is about a monolayer of hafnium oxide. In some embodiments, lower substrate temperatures, for example, down to 90° C. are possible. In some embodiments, after each deposition step, a nanocavity resonator of crystal 300 has a decreased radius to area ratio and increased thickness to lattice constant ratio.

Figure 3B:
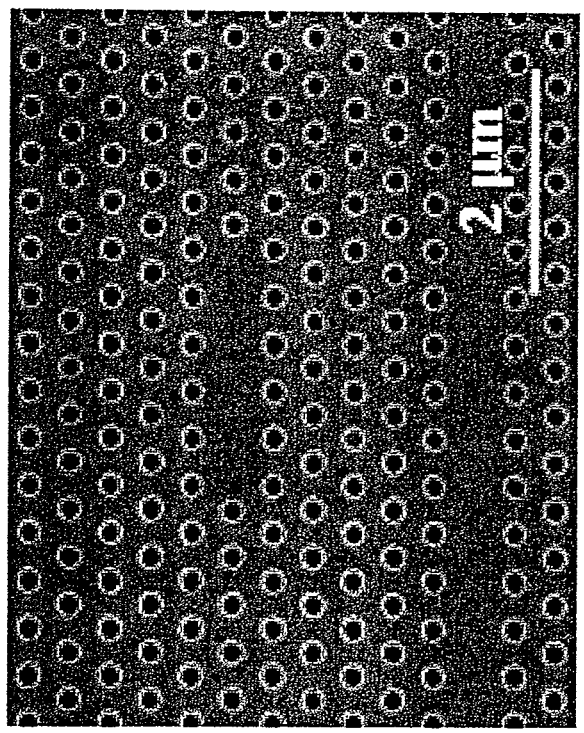
FIG. 3B is an illustration of a top-view scanning electronic microscope image of the photonic crystal of FIG. 4A after being tuned in accordance with some embodiments of the disclosed subject matter.
Figure 3A:
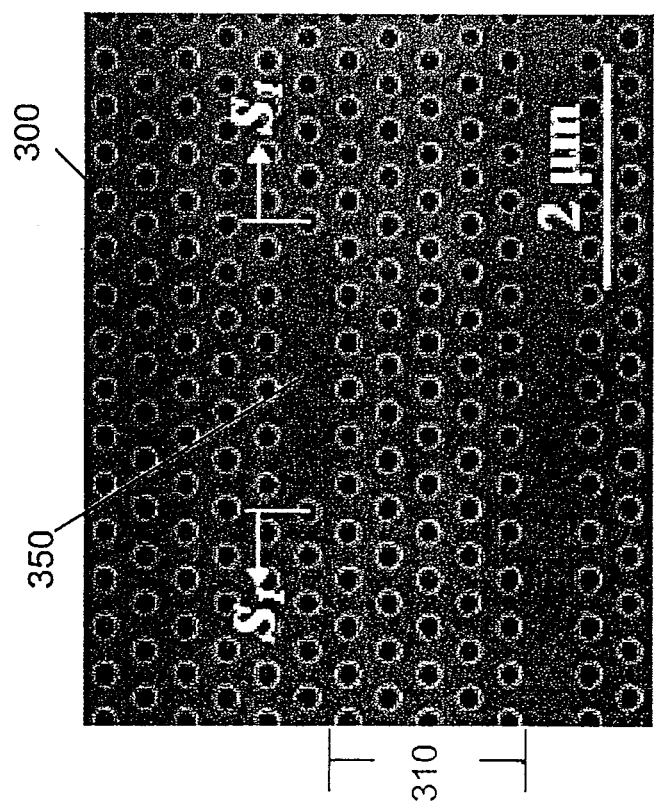
FIG. 3A is an illustration of a top-view scanning electronic microscope image of a photonic crystal including a nanocavity that can be tuned in accordance with some embodiments of the disclosed subject matter.
Figure 4B:
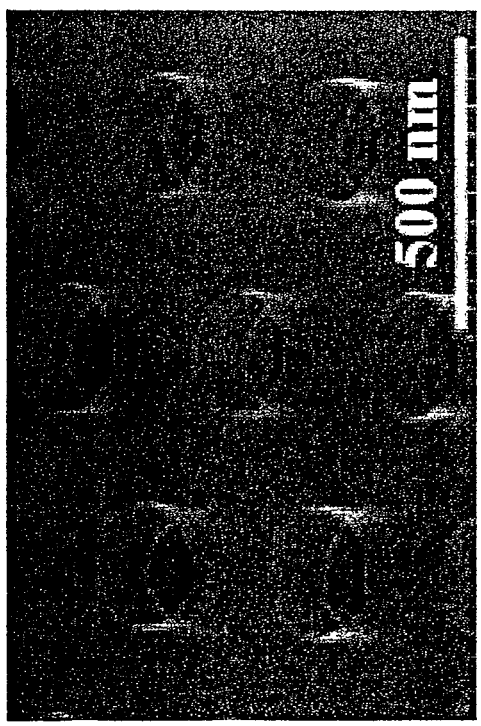
FIG. 4B is a 45° angle view of the photonic crystal of FIG. 3B from a scanning electronic microscope.
Figure 4A:
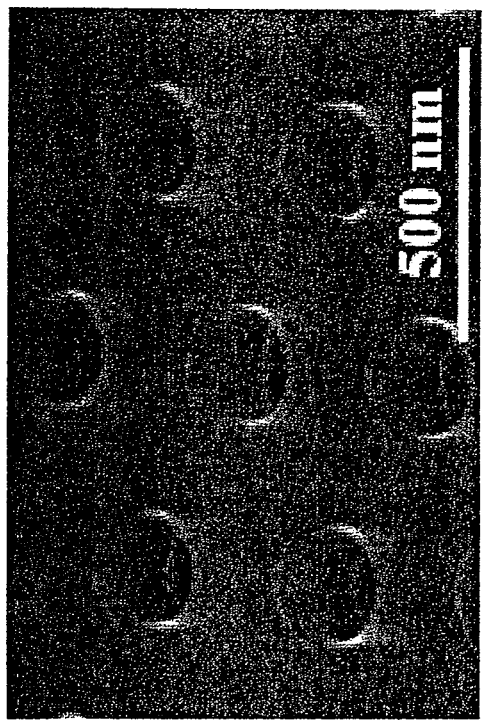
FIG. 4A is a 45° angle view of the photonic crystal of FIG. 3A from a scanning electronic microscope.

FIG. 3B shows a top-view SEM image of L5 cavity after seven deposition steps, with the same magnification as in FIG. 3A. Based on geometrical statistical analysis of high-resolution SEM images, in this example, the hole radius reduces from 92.84±1.56 nm to 79.86±2.66 nm. FIGS. 4A and 4B are the angled-view SEM images of air-bridged photonic crystal slabs before layer deposition tuning and after seven deposition steps, respectively. After the seven layers of deposition, the surface is still smooth enough to support high-Q modes for L5 nanocavities and the thickness of photonic crystal slabs increases from 190 nm to 216 nm based on SEM estimates. These geometry changes are illustrated in deposition schematic cross section of a sample morphology of in FIG. 6. In FIG. 6B, white space 610 represents empty space, black space 620 represents silicon, and grey space 630 represents $HfO_2$. As illustrated, dielectric material can cover, for example, the top and bottom of a structure as well as the interior side walls of airholes.

With slightly decreased r/a and increased t/a ratios in air-bridged photonic crystal slabs, the photonic band gap shifts to lower frequencies (where a=420 nm). In addition to a frequency shift, the photonic bandgap also decreases from an 11.4% to a 9.7% gap with a deposition of $HfO_2$, computed using a software package, for example, Meep, currently available at http://ab-initio.mit.edu/wiki/index.php/Meep. This can be attributed to a lower-index contrast between the holes and the bulk dielectric. Thus, the resonant wavelength of L5 nanocavities undergoes a red shift due to layer deposition tuning.

As discussed above, the resonant wavelength of an optical resonator and/or dispersion properties of a wave guide of crystal 130 can be tuned by performing layer deposition tuning on crystal 130. Tuning, at 140, can be done systematically to achieve a desired resonance wavelength and/or dispersion properties. In addition, the dielectric material to be deposited can be selected to provide approximately uniformly sized increases in the resonant wavelength and/or dispersion properties. In some embodiments, for example, to tune a resonant wavelength, deposition can be substantially performed only a resonator (e.g., cavity) and the surrounding area. In some embodiments, for example, to tune dispersion properties, deposition can be substantially performed only a waveguide and the surrounding area.

Figure 7:
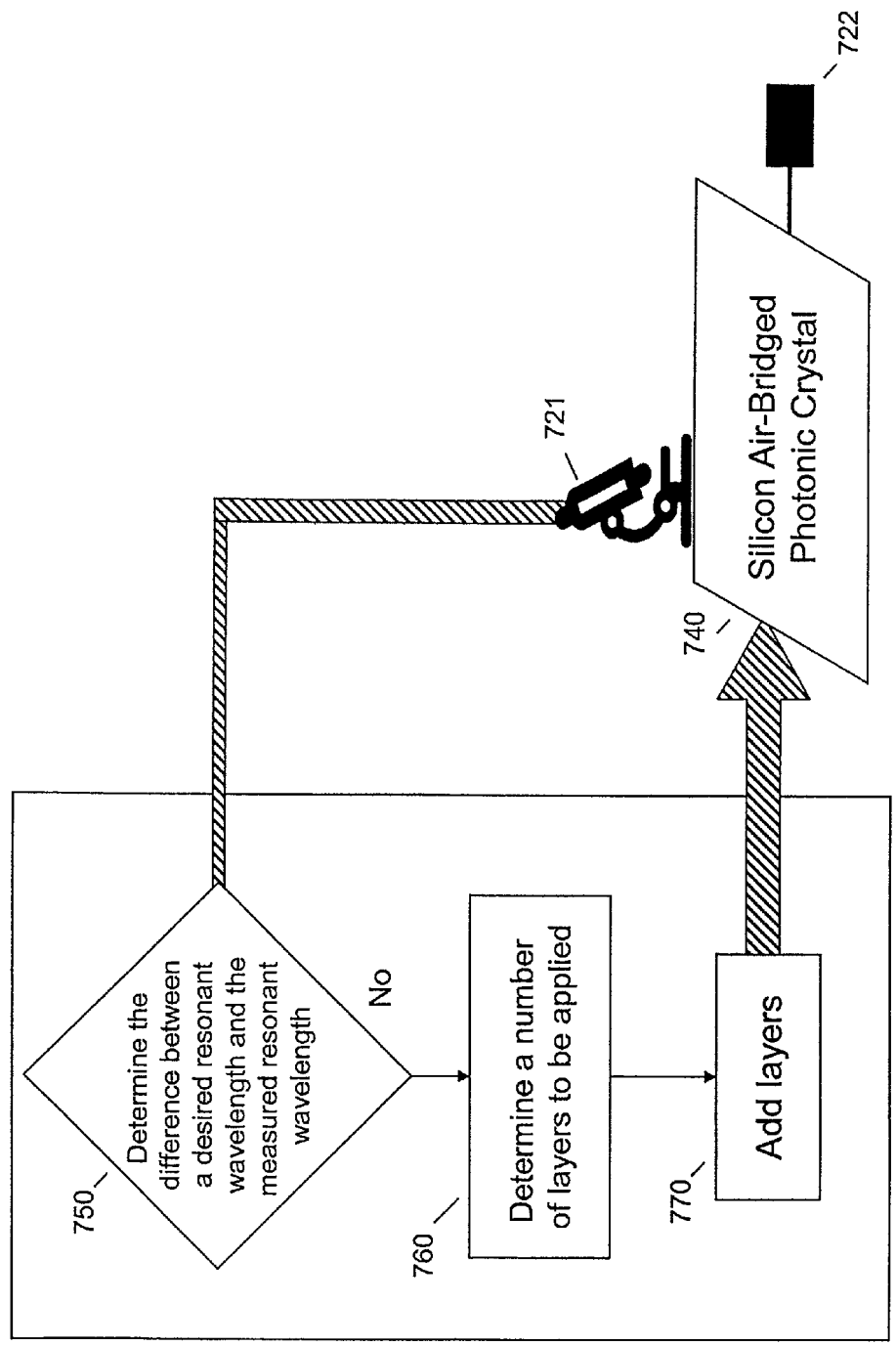
FIG. 7 is a simplified illustration of a system for tuning resonant wavelength and/or dispersion properties using layer application tuning of a predetermined number layers calculated to reach a desired resonant wavelength and/or desired dispersion properties in accordance with some embodiments of the disclosed subject matter.

For example, FIG. 7 illustrates a method of tuning a silicon air-bridged photonic crystal 740. The resonant wavelength of crystal 740 can be determined, at 750. This can be done, for example, by exposing crystal 740 to laser 722 and using detector 721 to observe the emitted resonant wavelength. At 760, the number of layers of dielectric material that needs to be applied to achieve a desired crystal resonant wavelength can be determined. This can be based on, for example, a predetermined tuning characteristic (e.g., the amount by which a layer of a dielectric material increases the resonant wavelength) and the difference between a desired resonant wavelength of crystal 740 and the resonant wavelength measured at 750. For example, if each layer of dielectric material is known to increase the resonant wavelength by 100 pm and the difference between the measured resonant wavelength and the desired resonant wavelength is 1000 mp, 10 layers of dielectric material can be applied at 770. In some embodiments, crystal 740 can then be tested again and, if necessary (e.g., if the resonant wavelength is still not sufficiently high) additional layers can be added.

Figure 8:
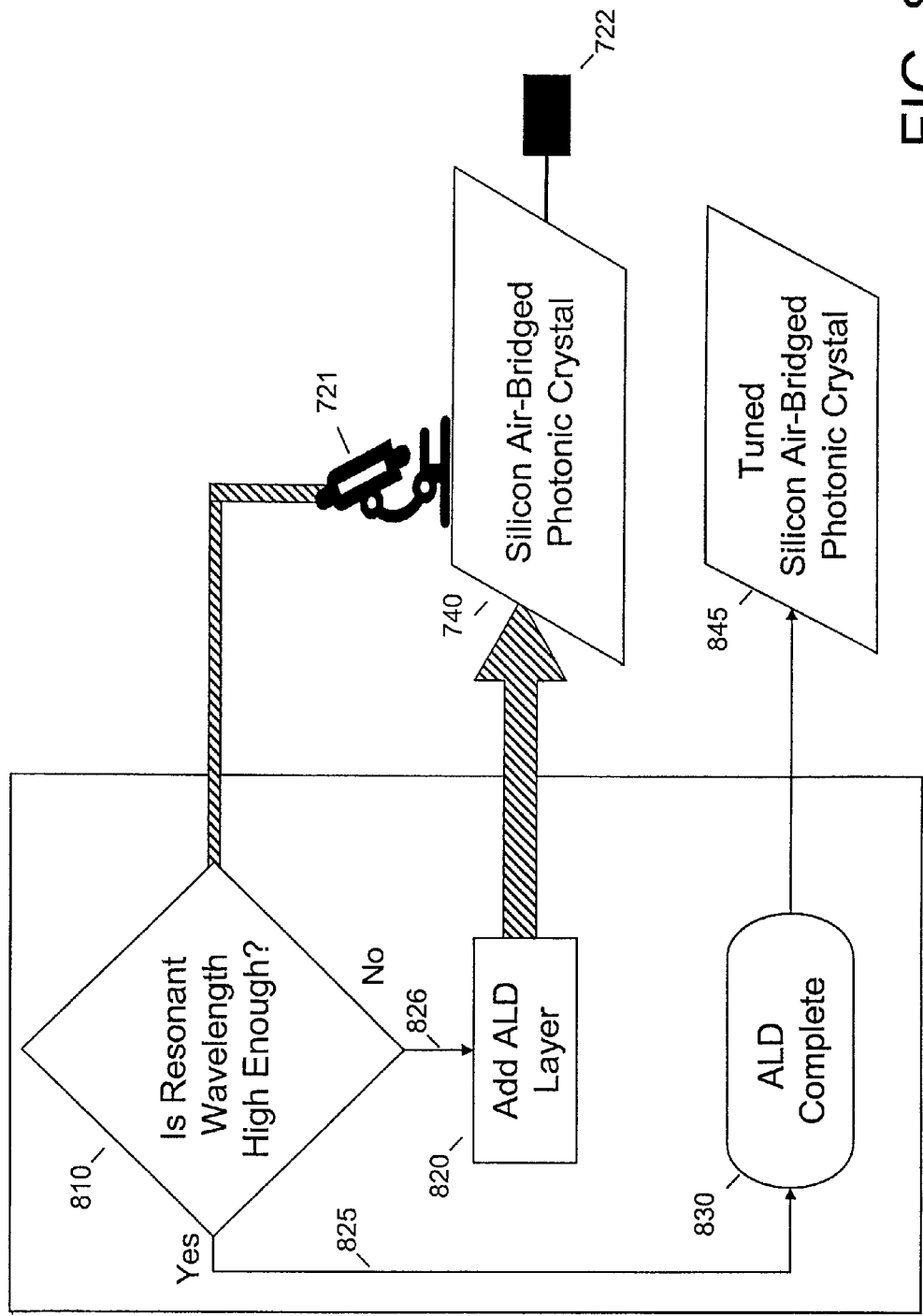
FIG. 8 is a simplified illustration of a system for measuring resonant wavelength and/or dispersion properties and tuning resonant wavelength and/or dispersion properties using layer application tuning until the resonant wavelength reaches a desired resonant wavelength and/or until the dispersion properties match desired dispersion properties in accordance with some embodiments of the disclosed subject matter.

FIG. 8 illustrates another method of tuning a silicon air-bridged photonic crystal 740. It can be determined, at 810, whether the resonant wavelength is sufficiently close to a desired resonant wavelength. This can be done, for example, by exposing crystal 740 to laser 722 and using detector 721 to observe the emitted resonant wavelength. If the resonant wavelength is not sufficiently close to the target resonant wavelength, branch 825 can be followed and layer deposition tuning can be performed, at 820, to deposit a layer (or layers) of dielectric material (e.g., $HfO_2$) on crystal 740. When the resonant wavelength is sufficiently close to the desired resonant wavelength, as determined at 820, branch 826 can be followed and tuning is considered complete, at 830. At then end of this example process, crystal 740 is, for example, a tuned silicon air-bridged photonic crystal 845.

Some embodiments provide, for example, wide tuning range and precise fine control of cavity resonances while preserving high quality factors. In some embodiments, observed deposition rate are approximately 0.93 Å $HfO_2$ per layer deposition cycle, which can lead to the red shift of resonant wavelength with precision of 122±18 pm for a resonant wavelength ~1.55 µM. The highly controlled, digital tuning of high-Q modes in silicon photonic crystal nanocavities allows for, for example, practical realization of optical devices involving multiple resonances and matching transitions between quantum dots and optical resonances for cavity quantum electrodynamics. Other applications include, for example, delay lines, all-optical buffers, highly non-linear devices, and quantum computing.

Figure 9:
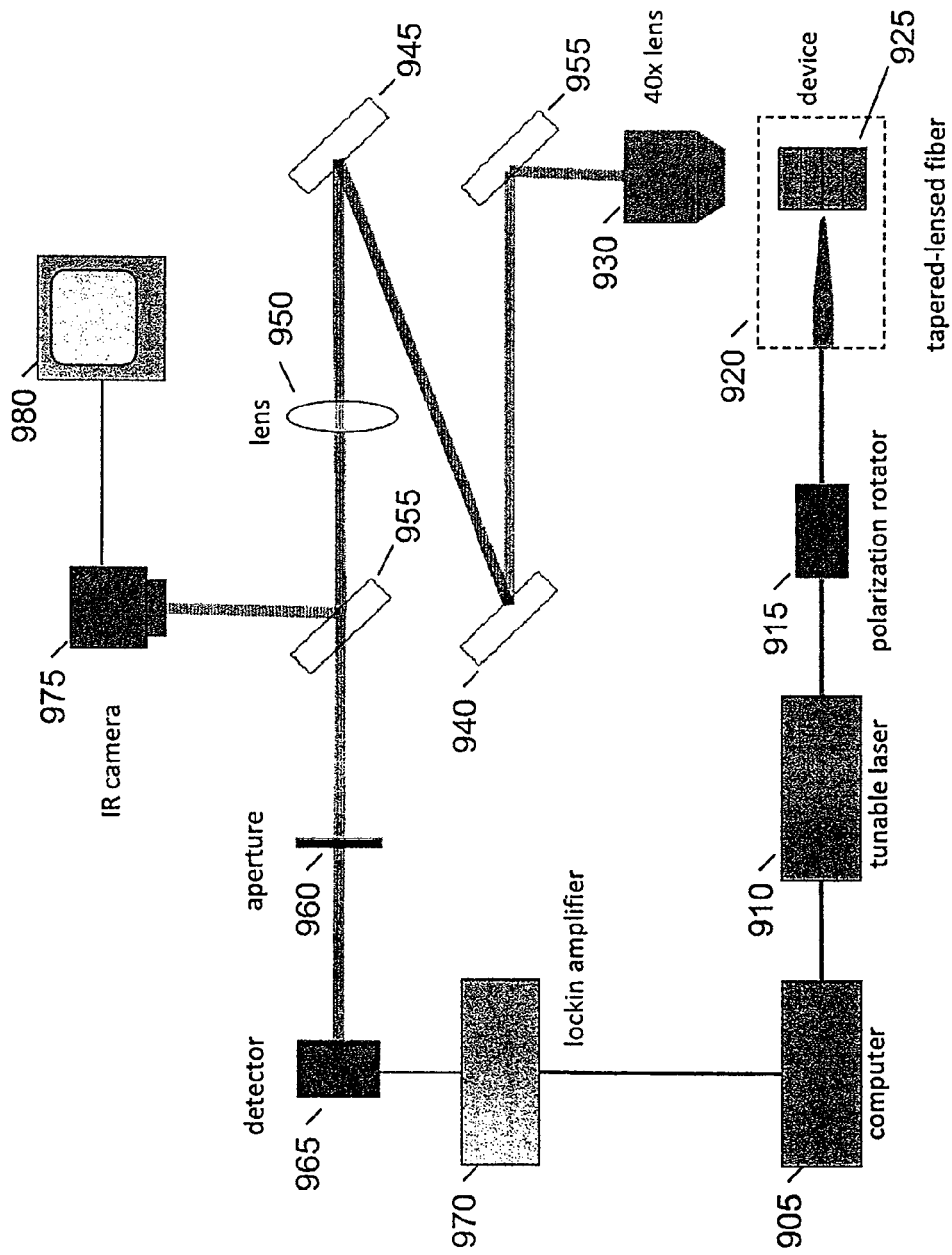
FIG. 9 is a simplified illustration of a system for measuring resonant wavelength in accordance with some embodiments of the disclosed subject matter.

FIG. 9 illustrates a more detailed illustration of system for determining whether resonant wavelength is sufficiently close to a desired resonant wavelength in accordance with some embodiments. In some embodiments, detector 721 and laser 722 of FIG. 7 can be made up of the various components of FIG. 9. Computer 905 can be used to control laser 910 to send infrared light (e.g., 1480-1580 nm wavelength, wavelength accuracy 10 nm, 200 kHz line width) through polarization rotator 915 to change the laser light polarization (using Transverse electric (TE) polarization). This light is coupled through taped-lensed fiber 920 to device 925 (e.g., crystal 130). The light is coupled to cavity 350 and 40× lens 30 to collect radiation emitted from the cavity 350. Mirrors 935, 940, and 945 are mirrors that are used to direct light as needed to reach, for example, a measuring device. Various embodiments can include other mirror arrangement or no mirrors at all. Lens 950 focuses the light and flip mirror 955 can be used to control whether the light is directed to aperture 960 or to IR camera 975. That is, if flip mirror 955 is flipped down, the light will not hit the mirror and will pass to aperture 960. If flip minor 955 is flipped up (as pictured) the light is reflected to IR camera 975. Aperture 960 can be a special filter, for example, a pin hole that lets the radiation from cavity 950 pass to and blocks other radiation. Detector 965 can be used to detect and record data (e.g., the data illustrated in FIGS. 10-12). Lock-in amplifier 970 can be used to reduce noise, such as, for example, from lighting fixtures, motors, cooling units, radios, computer monitors, etc.

Returning to the case where light is directed to IR camera 975, camera 975 can be in communication with display 980 (e.g., a television, a computer monitor, etc.) that can display a representation of the IR radiation emanating from cavity 350 as detected by camera 975. In some embodiments, a second lensed fiber collects the transmission from the waveguide output to check the total transmission loss of the whole system, which, in some embodiments, is around 24.8 dB at wavelength of 1550 nm. To exclude optical nonlinear effects, low input power of 10 can be coupled to the waveguide.

FIG. 10 illustrates a plot of measured cavity resonances after each deposition step for an L5 cavity with S1=0.02a, in accordance with some embodiments. FIG. 11 magnifies the resonance peak after the fourth deposition step. The quality factor Q is estimated from the full-width at half maximum and is ~49,000. From the 3D FDTD method, the Q factor and modal volume are calculated around 50,000 and ~0.98 cubic wavelengths $((\lambda/n)^3)$ respectively.

Figures 12A, 12B:
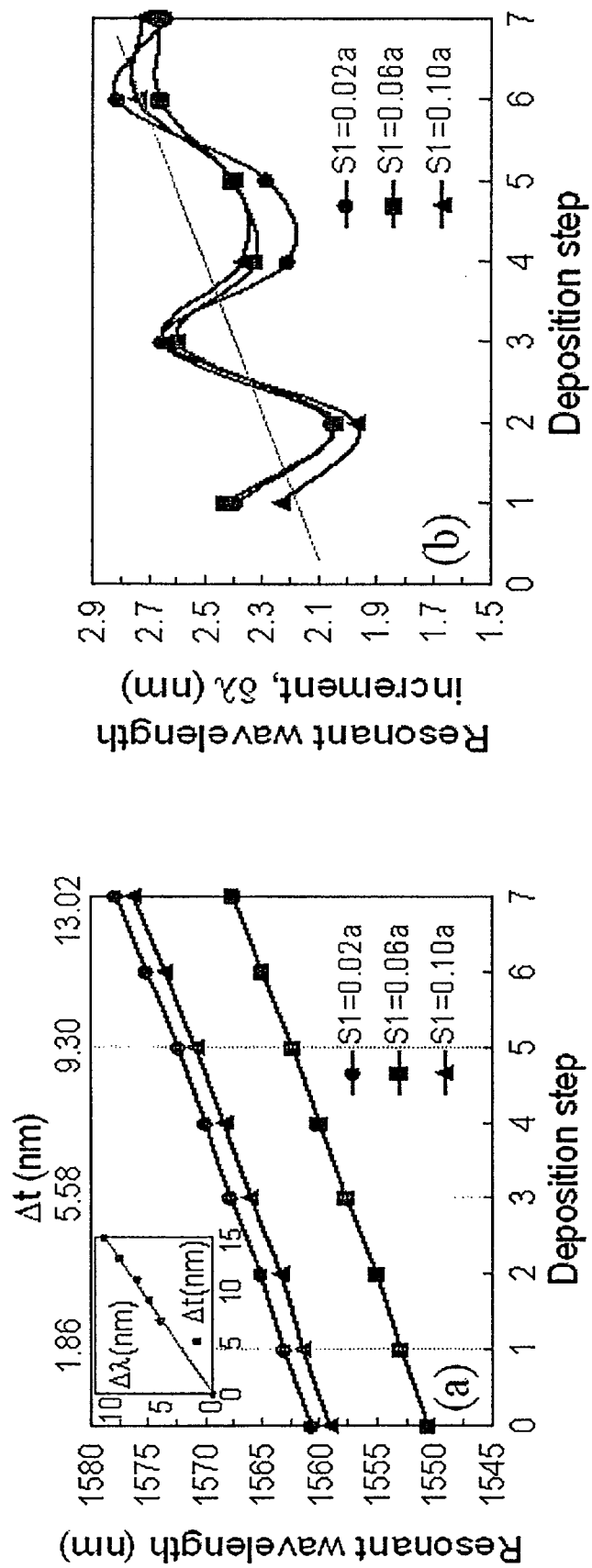
FIG. 12A is a graph illustrating resonant wavelength scaling linearly with the number of deposition steps in accordance with some embodiments of the disclosed subject matter.
FIG. 12B is a graph illustrating the wavelength increment after each deposition step of FIG. 12A in accordance with some embodiments of the disclosed subject matter.

FIG. 12A illustrates measurement results showing a tuned resonant wavelength that changes approximately linearly with the number of deposition steps for all three L5 cavities under investigation. In this example, total resonant wavelength tuning range is around 17 nm with seven deposition steps. With more deposition steps, wider tuning range can be obtained. The linear shift in the resonant wavelength of FIG. 12A correlates well with the 3D FDTD simulations (which are illustrated in the inset of FIG. 12).

FIG. 12B illustrates plots of the wavelength increment for each deposition step. In this example, an average wavelength red shift of 2.443±0.359 nm is obtained for each step, which corresponds to a resonance shift of 122±18 pm per $HfO_2$ monolayer deposition. As can be seen, an oscillatory variation of the resonance shift is observed. This is due to variations in the film deposition thickness, which is not perfectly the same in each step. In addition, it can be seen that the resonance increment itself increases slightly from 2.2 nm to 2.7 nm based on the linear curve fit. This increase is because, in some embodiments of layer deposition tuning, more dielectric material is added relative to the previous step due to the expanded surface area, so that the resonance increment also slightly goes up, as illustrated in deposition schematics in FIG. 6.

With different deposition material, the precision of resonant wavelength shift per deposition cycle can be changed. For example, single monolayer of $HfO_2$ induces an average 122 pm shift (n=1.88 at 1.55 µm, 0.93 Å per ALD cycle at 150° C.). From first-order perturbation analysis, a monolayer of $TiO_2$ (n=2.18 at 1.55 µm, 0.5 Å per ALD cycle at 100° C.)

can induce a 54 pm shift, while a monolayer of $Al_2O_3$ (n=1.57 at 1.55 μm, 1 Å per ALD cycle at 100° C.)) can generate a 158 pm wavelength shift.

Figure 12C:
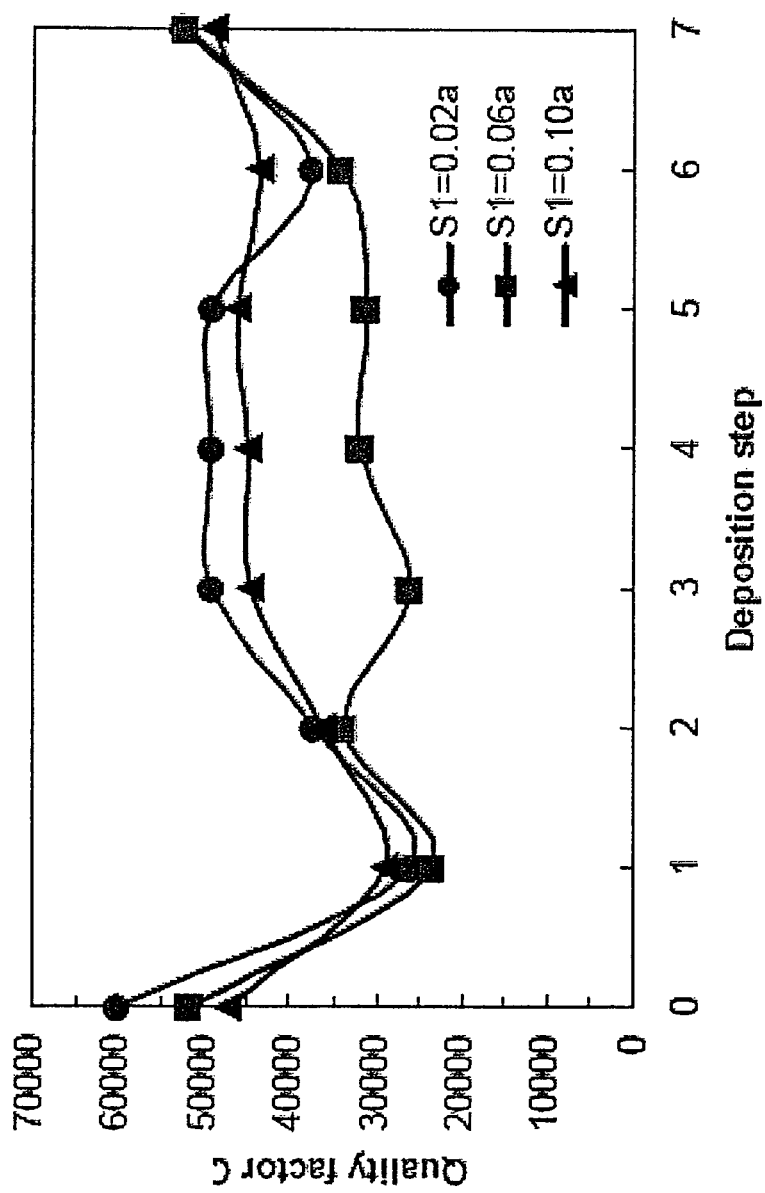
FIG. 12C is a graph illustrating the variation of quality factor (Q) with the number of deposition steps of FIG. 12A in accordance with some embodiments of the disclosed subject matter.

FIG. 12C illustrates a variation of quality factor Q with the number of deposition steps for three L5 cavities. After first deposition step, Q values drop almost by half for each of the example cavities. This is likely because the roughness effects of surface and air hole sidewall are magnified initially by the ALD deposited film. During the following deposition steps, the deposited surface is smoother, permitting the Q values to recover back to almost their initial values. In these examples, the Q values maintain at least 20,000 during the deposition steps, which is also observed in the 3D FDTD simulations. This demonstrated shift in the resonance, while preserving the cavity Q, in response to a monolayer deposition also suggests these cavities, in accordance with some embodiments, can be used as, for example integrated sensors with pronounced responsivity to environmental conditions.

Figure 13B:
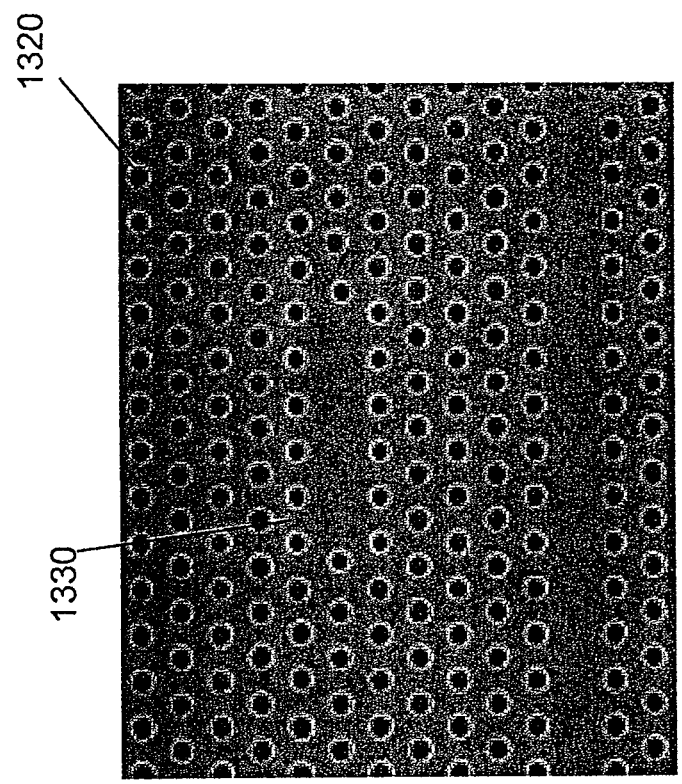
FIG. 13B is an illustration of a top-view scanning electronic microscope image of the photonic crystal of FIG. 13A after being tuned in accordance with some embodiments of the disclosed subject matter.
Figure 13A:
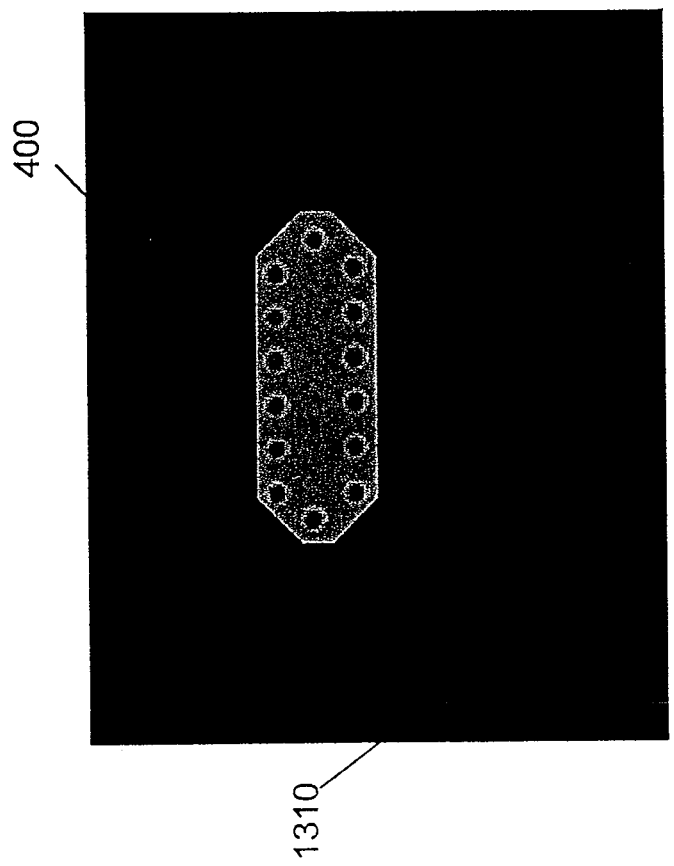
FIG. 13A is an illustration of a top-view scanning electronic microscope image of a photonic crystal including a nanocavity with part of the crystal covered by a mask that can be tuned in accordance with some embodiments of the disclosed subject matter.

Some embodiments can tune specified portions (e.g., individual cavities, individual air holes, groups of air holes, shapes of a surface, etc.) of crystal 130, by, for example using area selective deposition. Selective deposition can be performed using various systems and methods, for example, ALD, photolithographic lift-off, e-beam resists (e.g., ZEP, HSQ, and SU-8), and nanoimprint lithography. For example, dielectric monolayers such as $HfO_2$ with submicron features can be selectively deposited only at the nanocavity region using low-temperature deposition. Selective deposition can provide finer tuner of resonant wavelength. FIG. 13 illustrates crystal 300 of FIG. 3 with mask 1310 over a portion of the crystal. After tuning, at 140, portion 1320 of FIG. 13B has had deposition performed on it, while portion 1330 has not. As can be seen, the air holes in portion 1320 are smaller than the air holes in portion 1330. In another example, to tune dispersion properties of a crystal wave guide, selective deposition can be performed to deposit a dielectric material only a waveguide and surrounding air holes.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A method for tuning a resonant wavelength of an optical resonator, the method comprising:
   providing an optical resonator having a surface;
   determining an initial resonant wavelength emitted by the optical resonator in response to an electromagnetic radiation input;
   applying a layer of dielectric material to the surface of the optical resonator;
   determining a tuned resonant wavelength emitted by the optical resonator after application of the layer;
   determining whether the tuned resonant wavelength is within a predetermined resonant wavelength range; and
   applying a second layer of dielectric material if the tuned resonant wavelength is outside of the predetermined resonant wavelength range.

2. The method of claim 1, wherein the optical resonator is a photonic crystal nanocavity.

3. The method of claim 1, wherein the optical resonator comprises a portion of a photonic crystal that is substantially free from air holes wherein the photonic crystal includes air holes.

4. The method of claim 1, wherein the layers of dielectric material are applied using atomic layer deposition.

5. The method of claim 1, wherein the optical resonator comprises part of a photonic crystal and further comprising using a mask during the applying of the layers of dielectric material to apply the dielectric material to a selected portion of the photonic crystal.

6. The method of claim 5, wherein the selected portion of the photonic crystal comprises the optical resonator and air holes around a periphery of the resonator.

7. The method of claim 1, wherein the dielectric material comprises at least one of hafnium oxide, aluminum oxide, titanium dioxide, silicon dioxide, gallium nitride, and silicon nitride.

8. The method of claim 1, wherein the electromagnetic radiation comprises laser light.

9. The method of claim 1 wherein the optical resonator comprises one of a whispering gallery mode structure, microdisk, micro-sphere, micro-ring, photonic crystal cavity, and racetrack resonator.

10. The method of claim 1 wherein each layer of dielectric material is a monolayer.

11. The method of claim 1 wherein each layer of dielectric material is about 0.93 angstroms in thickness.

12. The method of claim 1, further comprising applying a third layer of dielectric material if the tuned resonant wavelength is outside of the predetermined range of the target resonant wavelength, whereby the optical resonator is incrementally tuned.

13. A method for tuning dispersion properties of a photonic crystal waveguide, the method comprising:
   providing a photonic crystal waveguide;
   determining an initial dispersion property of the crystal waveguide;
   applying a layer of dielectric material to the photonic crystal;
   determining a tuned dispersion property of the photonic crystal waveguide after application of the layer;
   determining whether the tuned dispersion property is within a predetermined range of a target dispersion property;
   applying a second layer of dielectric material if the tuned dispersion property is outside of the predetermined range of the target dispersion property.

14. The method of claim 13, wherein the dispersion property is at least one of group velocity and group index.

15. The method of claim 13, further comprising determining the initial dispersion property of the crystal waveguide based on observing transmissions through the crystal waveguide.

16. The method of claim 13, wherein the waveguide comprises a portion of the photonic crystal that is substantially free from air holes wherein the photonic crystal includes air holes.

17. The method of claim 13, wherein the layers of dielectric material are applied using atomic layer deposition.

18. The method of claim 13, wherein the dielectric material comprises at least one of hafnium oxide, aluminum oxide, titanium dioxide, silicon dioxide, gallium nitride, and silicon nitride.

19. The method of claim 13 wherein each layer of dielectric material is a monolayer.

20. The method of claim 13 wherein each layer of dielectric material is about 0.93 angstroms in thickness.

21. The method of claim 13, further comprising the step of applying a third layer of dielectric material if the tuned dispersion property is outside of the predetermined range of the target dispersion property, whereby the photonic crystal waveguide is incrementally tuned.

\* \* \* \* \*